(No Model.)

L. BRANDT.
NUT LOCK.

No. 322,155. Patented July 14, 1885.

WITNESSES:
Harrison B Brown
W. X. Stevens.

INVENTOR:
Louis Brandt
BY Munn & Co
ATTORNEYS.

UNITED STATES PATENT OFFICE.

LOUIS BRANDT, OF SABINA, OHIO, ASSIGNOR TO HIMSELF, MRS. DAVID EDWARDS, AND B. FRANK. DARBYSHIRE, OF SAME PLACE.

NUT-LOCK.

SPECIFICATION forming part of Letters Patent No. 322,155, dated July 14, 1885.

Application filed October 1, 1884. (No model.)

*To all whom it may concern:*

Be it known that I, LOUIS BRANDT, a citizen of the United States, residing at Sabina, in the county of Clinton and State of Ohio, have invented certain new and useful Improvements in Nut-Locks, of which the following is a description.

This invention relates to that class of devices which are used to keep screw-nuts from being jarred off from bolts, and its object is, especially, to retain the nuts on bolts which are used to hold the fish-plates to rails. To this end my invention consists in the construction and combination of parts forming a nut-lock, hereinafter described and claimed, reference being had to the accompanying drawings, in which—

Figure 1:
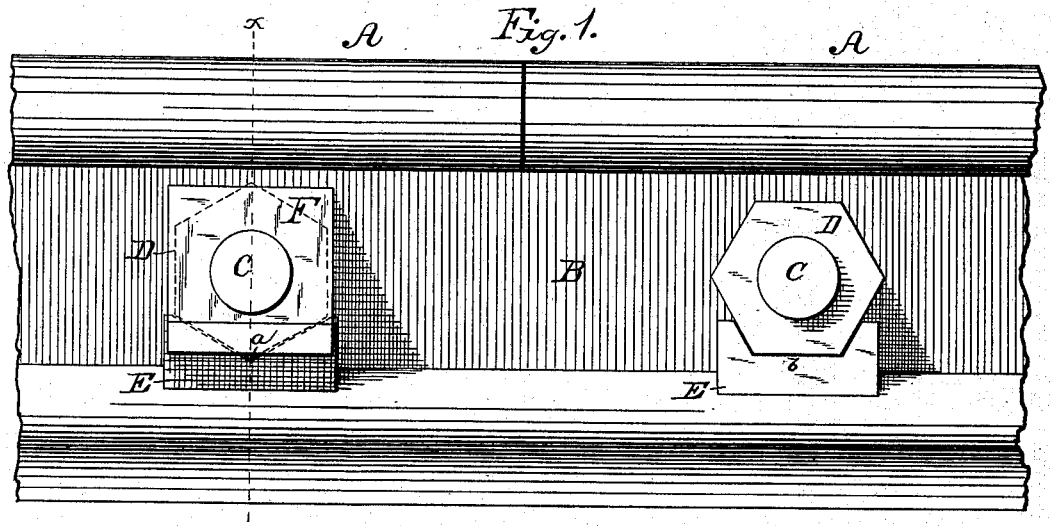
Figure 2:
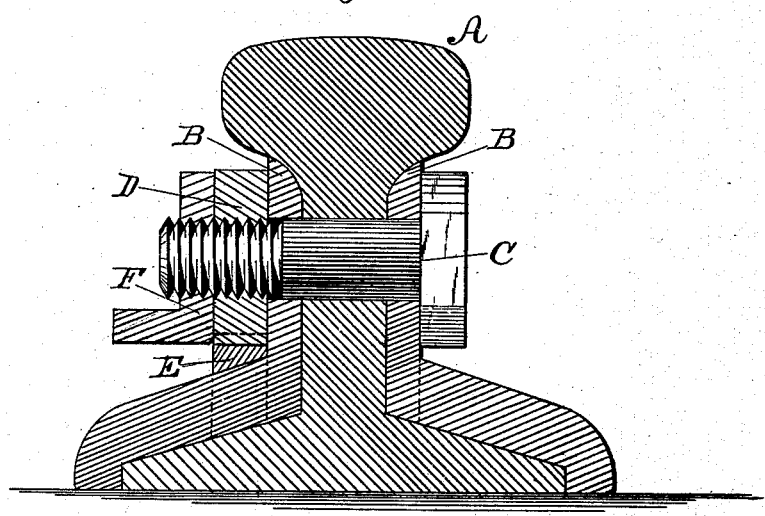

Figure 1 is a side elevation of a portion of a railroad-rail fish-joint, showing my invention, and Fig. 2 is a transverse vertical section of a rail, the fish-plates, and my nut-lock, showing the bolt in elevation.

A represents the rail; B, the fish-plates; C, a bolt, and D a nut screw-threaded thereon, as usual.

E is a block, of any suitable material, fitted on its under and rear sides to the corner in the fish-plate, and provided with a notch in its upper side to receive and fit closely to a portion of the nut including at least one corner thereof. I have shown the block at *a* as taking in one corner of a square nut, and at *b* as taking in two corners of a hexagon nut. This block, when inserted as described, holds the nut firmly from turning. In case the fish-plate is plane and vertical, instead of angular, my block E will be shaped to fit into the corner formed at the juncture of the plate and the base-flange of the rail. In any case, in order to use my block there must be a solid portion of or connected with the nut-base extending forward of the base somewhat parallel with the nut to form a recess to receive the block below the nut. In some cases this block might be driven tight enough to keep its place; but it will generally require a holder of some kind to keep it from working from under the nut. Any suitable fastener may be used for this purpose; but I have devised one consisting of the angular nut F. This nut is screw-threaded to fit upon the bolt, onto which it is screwed far enough to press against the block E to hold the latter in place. The bolts are usually placed as low down in fish-plates as the nuts will turn thereon. I have, therefore, provided means for weighting one side of the nut to any extent required to prevent its turning from jar or friction by bending the plate of the nut into an angle whose outer extremities are only equally distant from the center of the bolt with other corners of the nut thus weighted, and the outward arm of the nut thus formed may extend parallel, or nearly so, to the bolt as far as required.

I am aware that nuts made eccentric or out of balance are common, and I do not claim such, broadly, as my invention.

What I claim as my invention, and desire to secure by Letters Patent, is—

The combination, with a fish-plate, a screw-bolt and a nut fitted thereon against the face of the plate, and a solid projection forward of the face of the plate, of a block fitted to an angle of the nut and filling the space between the nut and the said projection, and another screw-nut weighted at one side and projecting beyond the periphery of the first-named nut over the face of the said block, substantially as shown and described, whereby the weighted nut retains the block between the nut proper and the said projection, as set forth.

LOUIS BRANDT.

Witnesses:
JAMES R. AMOS,
B. F. DARBYSHIRE.